(12) United States Patent
Varunny

(10) Patent No.: US 7,632,205 B2
(45) Date of Patent: Dec. 15, 2009

(54) INFINITELY VARIABLE GEAR TRANSMISSION WITH MICROPROCESSOR CONTROL

(76) Inventor: Kodamkandeth Ukkru Varunny, IV/330, Manalur, Trichur District, Kerala. P.C. 680 617 (IN)

(*) Notice: Subject to any disclaimer, the term of this patent is extended or adjusted under 35 U.S.C. 154(b) by 363 days.

(21) Appl. No.: 10/557,220

(22) PCT Filed: May 4, 2005

(86) PCT No.: PCT/IN2005/000142

§ 371 (c)(1),
(2), (4) Date: Nov. 18, 2005

(87) PCT Pub. No.: WO2006/008756

PCT Pub. Date: Jan. 26, 2006

(65) Prior Publication Data

US 2007/0167270 A1    Jul. 19, 2007

(30) Foreign Application Priority Data

Dec. 27, 2004    (IN) .................. 1439/CHE/2004

(51) Int. Cl.
*F16H 48/06*    (2006.01)

(52) U.S. Cl. ..................... 475/225; 475/207

(58) Field of Classification Search .................. 475/91, 475/150, 116, 207, 214, 215, 218, 220, 221, 475/225, 230, 242

See application file for complete search history.

(56) References Cited

U.S. PATENT DOCUMENTS

| | | | |
|---|---|---|---|
| 3,496,803 A * | 2/1970 | Whelahan | 477/1 |
| 2004/0048714 A1* | 3/2004 | Phelan et al. | 475/225 |
| 2005/0070391 A1* | 3/2005 | Folsom et al. | 475/23 |

* cited by examiner

Primary Examiner—David D Le

(57) ABSTRACT

An infinitely variable gear transmission system for vehicles includes a differential gear unit for input, an epicyclic gear unit, two hydraulic pumps and a hydraulic circuit having direction control valves and orifices, intercoupling the two hydraulic pumps, one of the hydraulic pumps rotating with the first output shaft of the differential gear unit and one of the three gear elements of the epicyclic gear unit, and the second hydraulic pump rotating with the second output shaft and the second gear element, and a control unit to selectively control the direction and the fluid pressure in the hydraulic circuit and control the speed of the third gear element in clockwise and anticlockwise direction. In another embodiment the hydraulic circuit includes a flow control valve with variable orifice and a controller to continuously check and control the opening of the orifice, and correct the fluid pressure for the exact output speed.

2 Claims, 9 Drawing Sheets

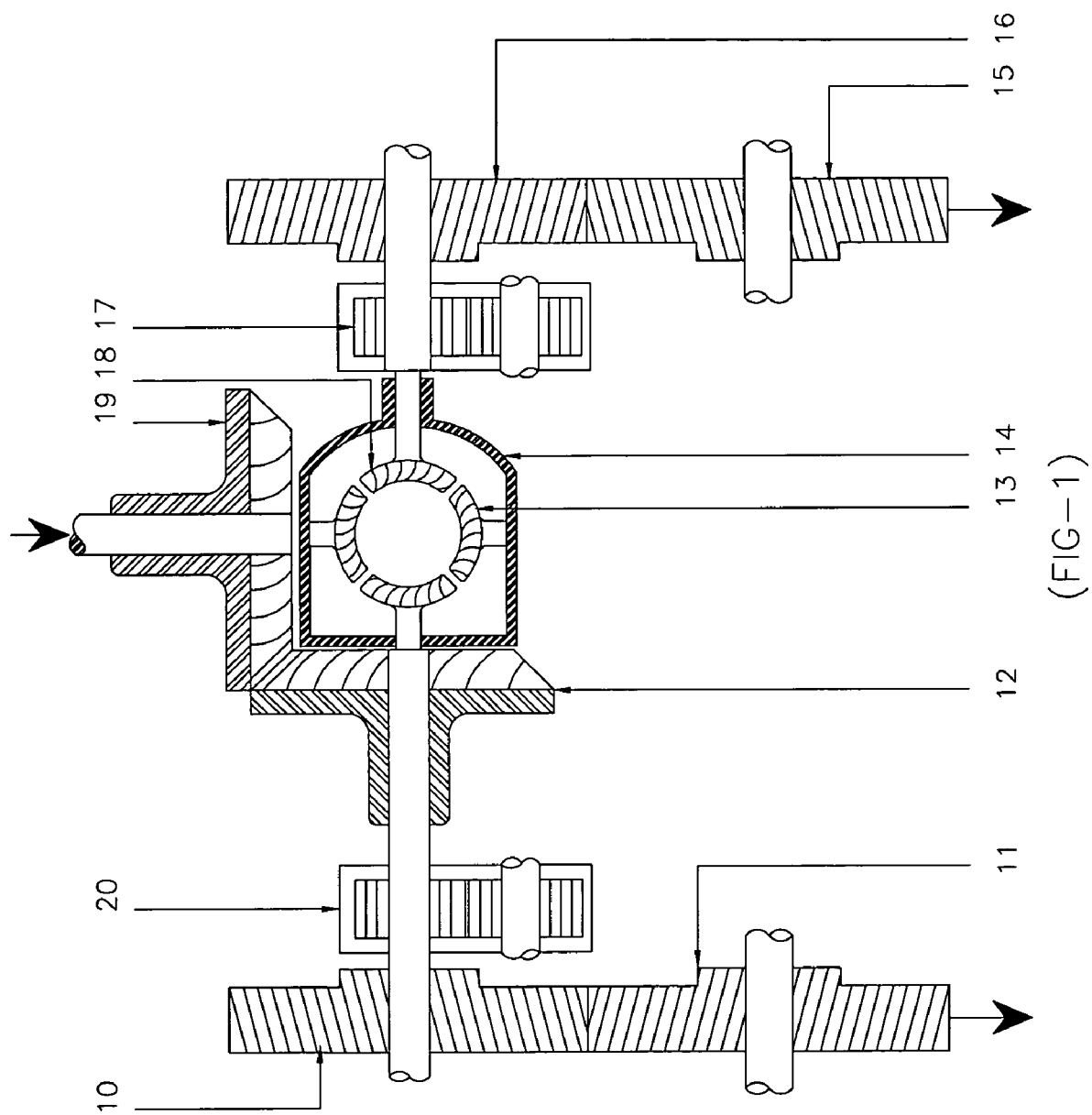

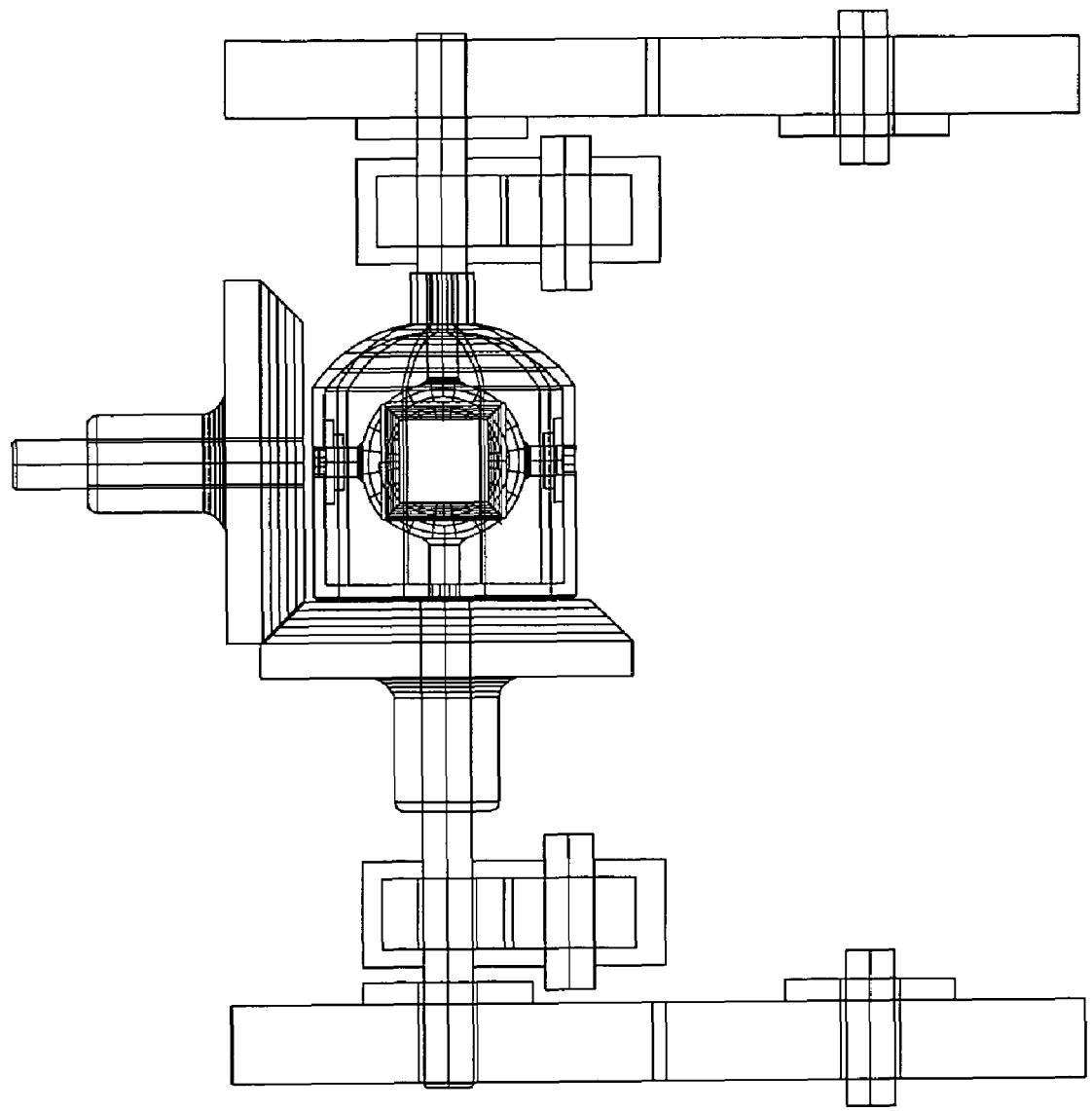
(FIG-2)

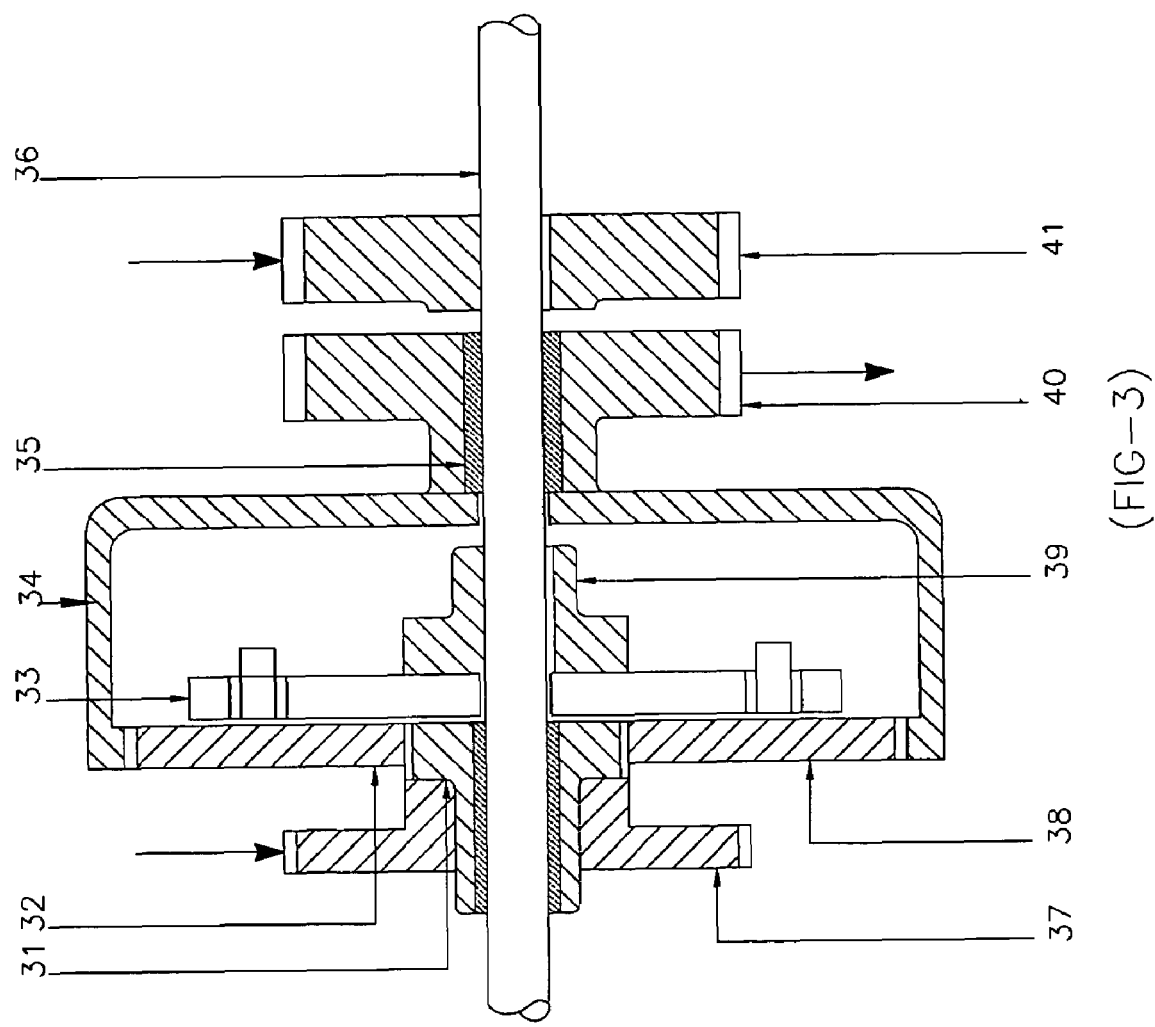

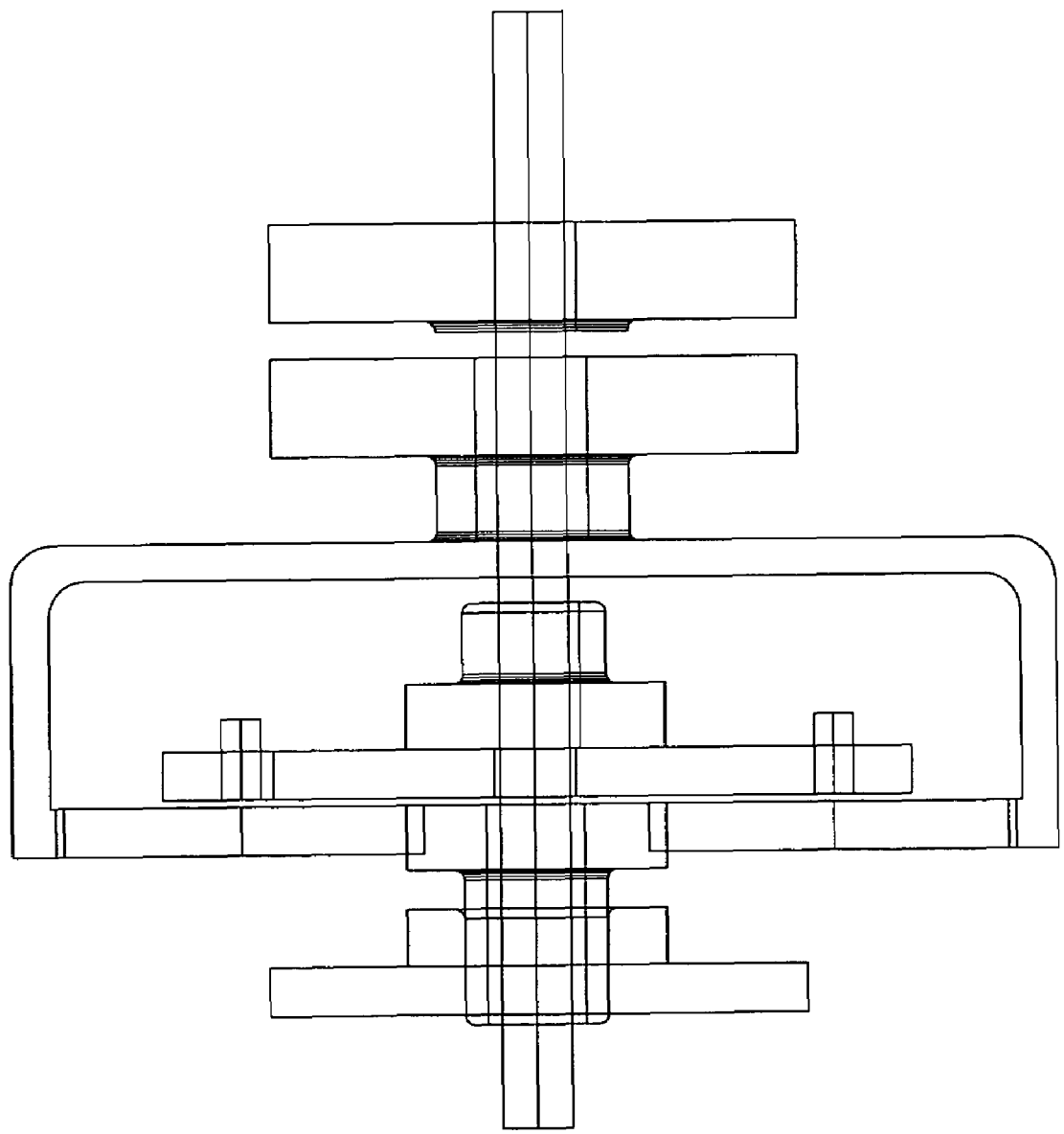
(FIG-4)

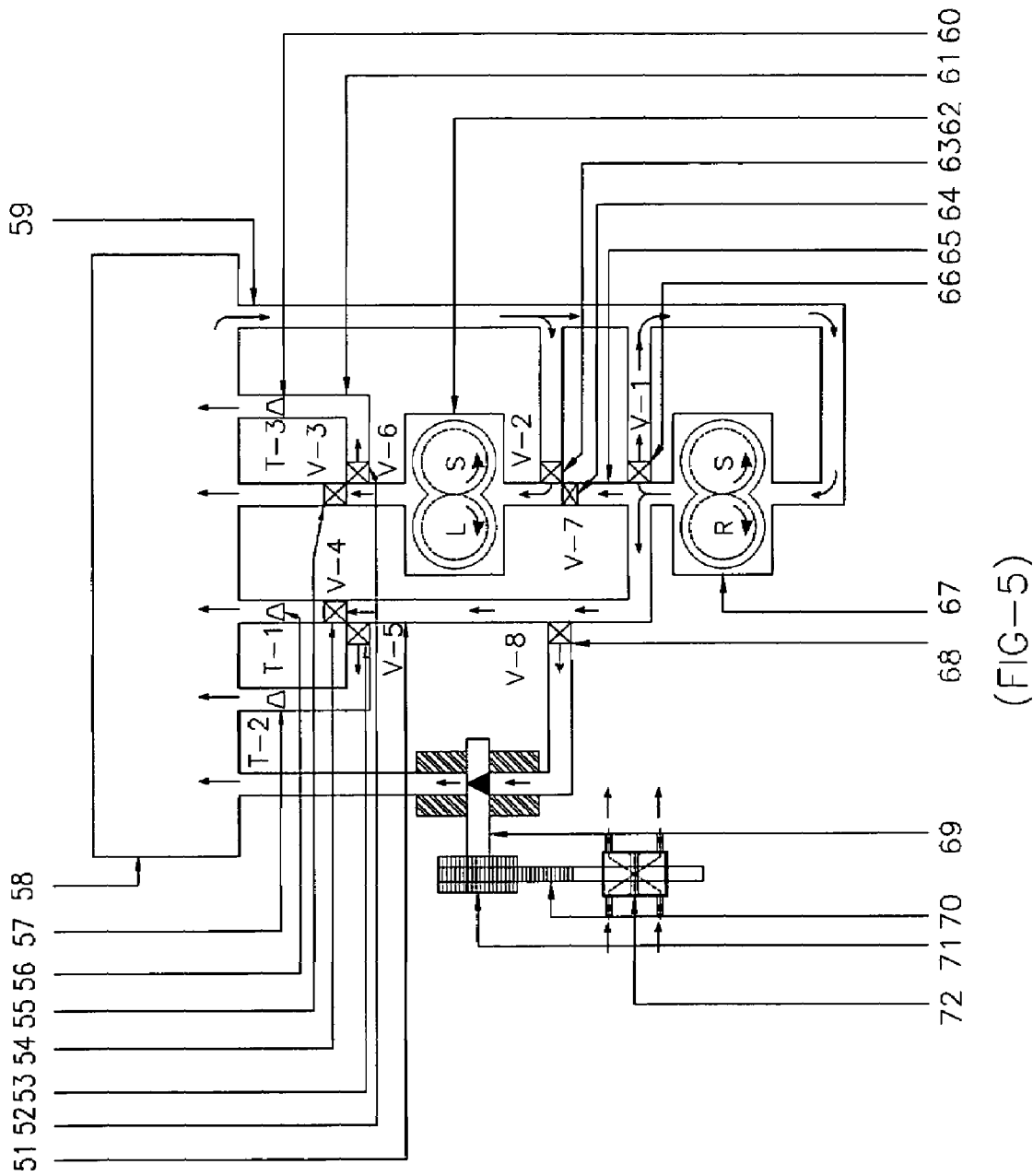

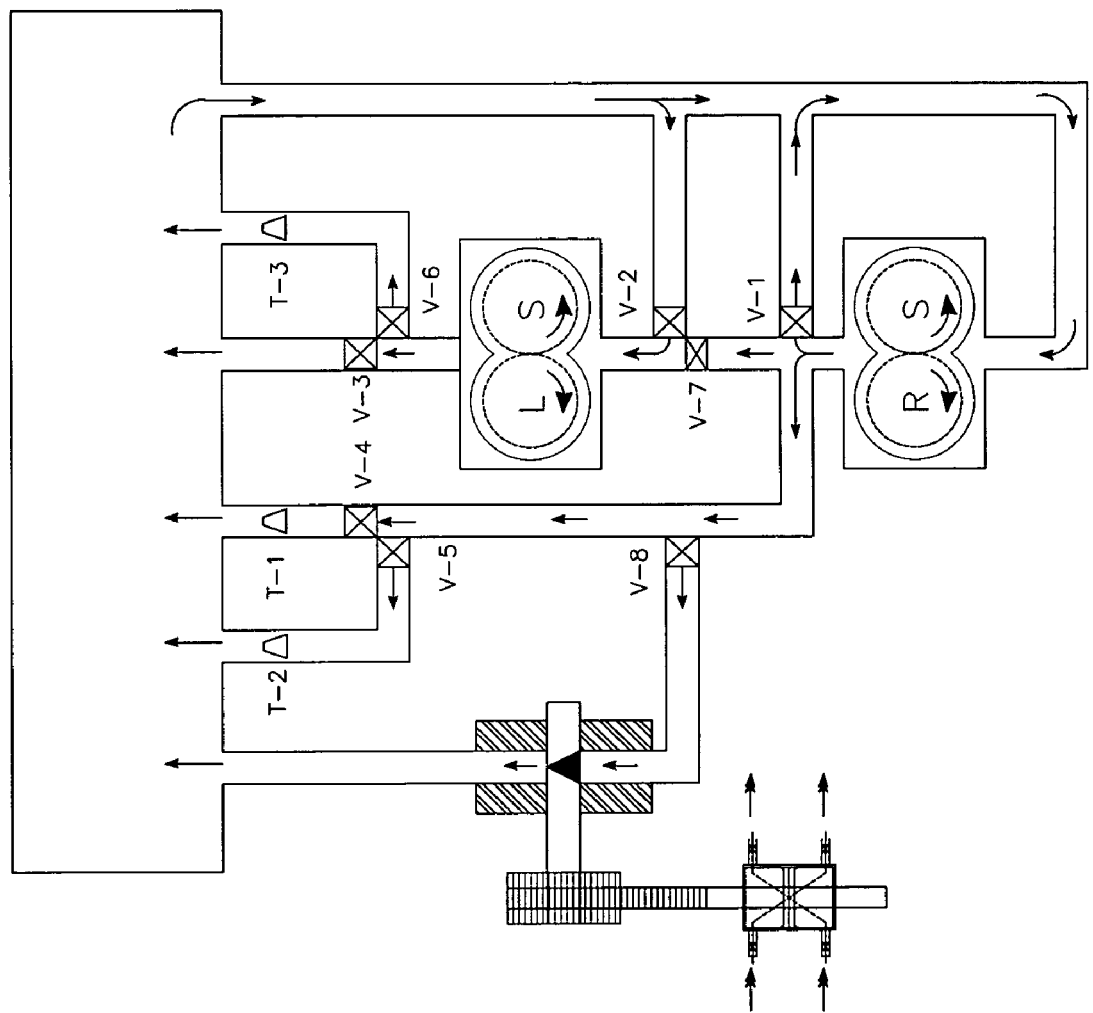
(FIG-6)

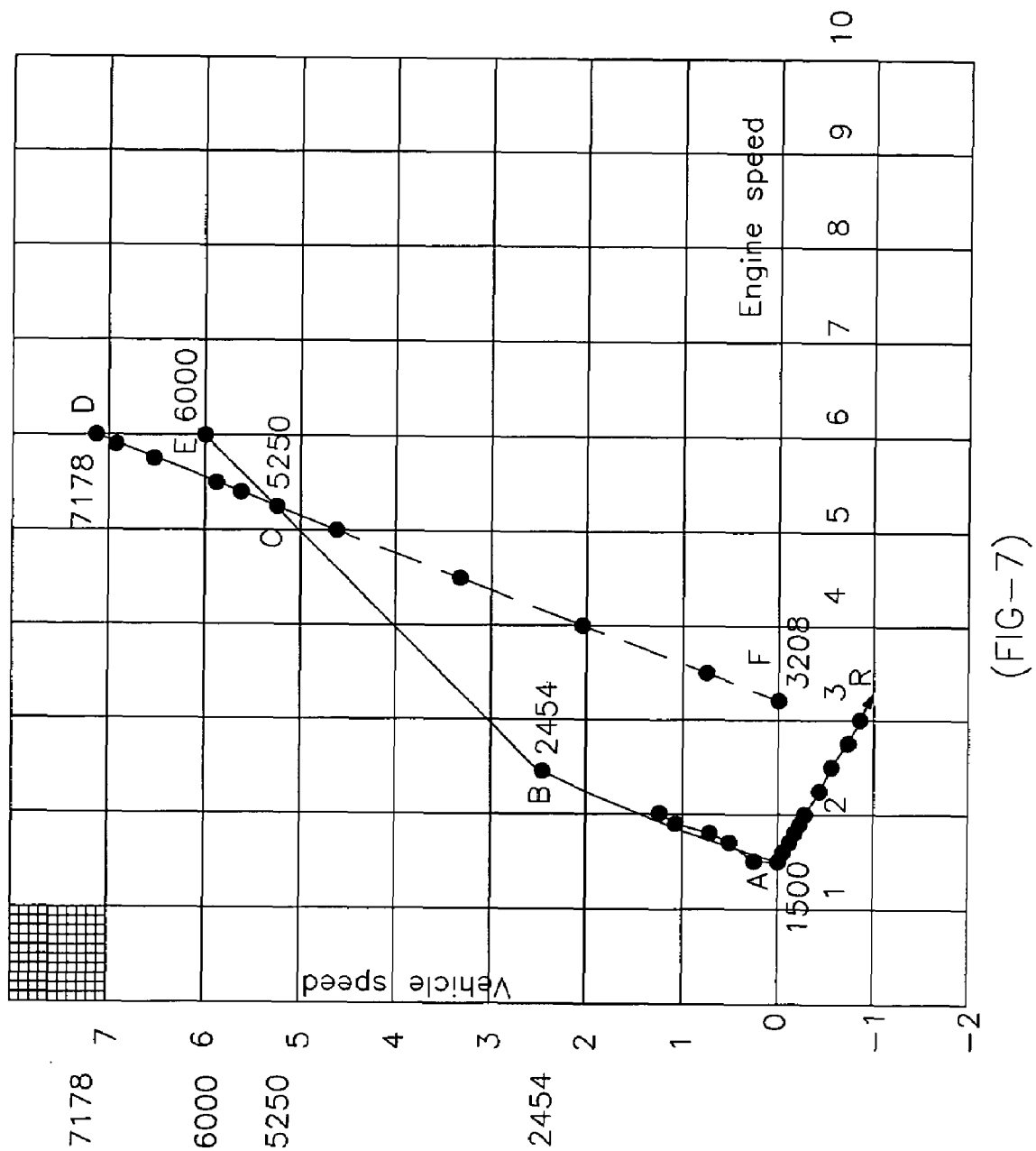
(FIG-7)

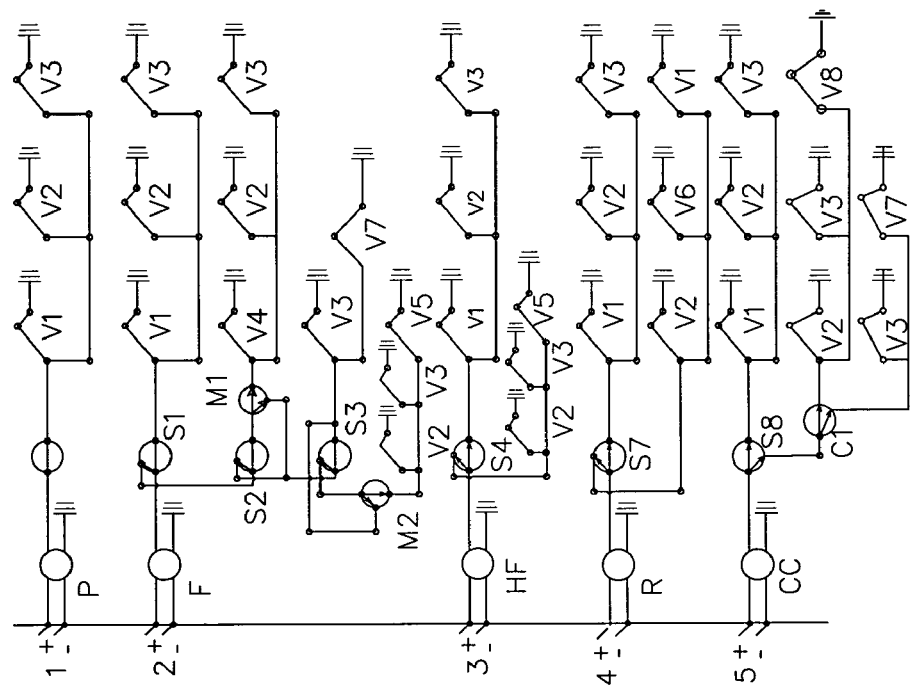
(FIG-8)

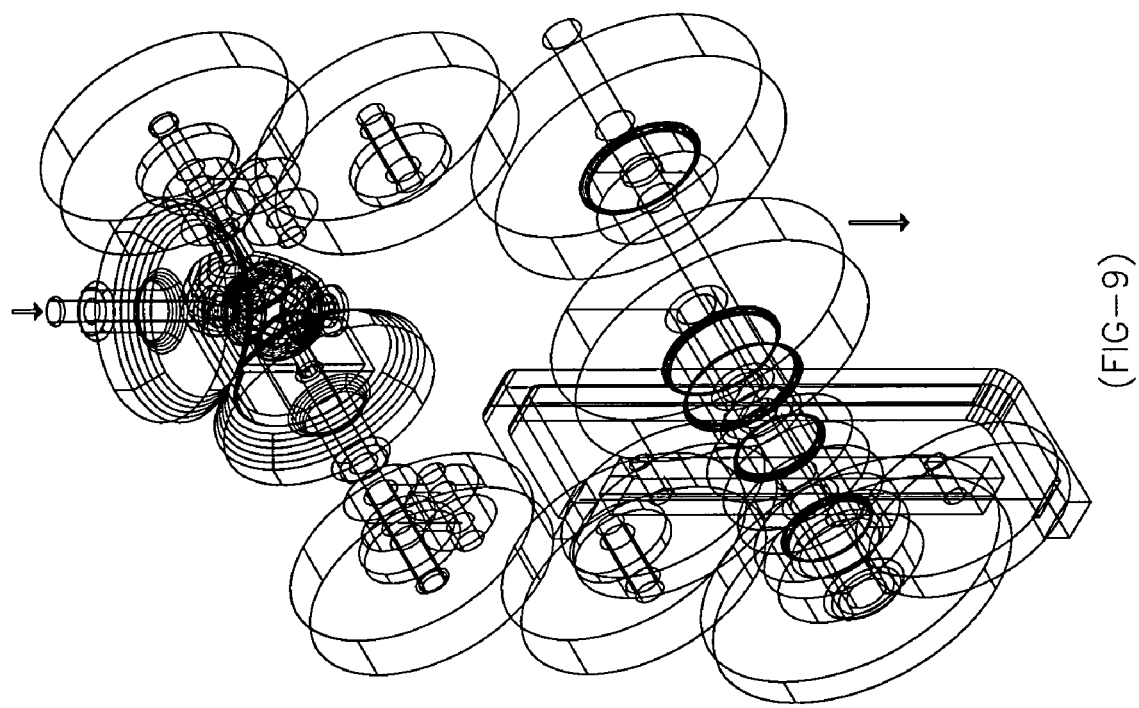
(FIG-9)

INFINITELY VARIABLE GEAR TRANSMISSION WITH MICROPROCESSOR CONTROL

This is a continuation of international application no: PCT/IN2005/000142 filed on 4 May 2005 and published as international publication no: WO 2006/008756 A1 on 26 Jan. 2006, having priority date as 27 Dec. 2004 of Indian application no: 1439/CHE/2004 for which patent has been granted as Patent no: 209664 on 5 Sep. 2007.

TECHNICAL FIELD

The present invention is directed to an infinitely variable gear transmission system for a vehicle drive line and, more particularly, to a transmission system having a single stage epicyclic gear unit coupled with a differential gear unit.

BACKGROUND OF THE INVENTION

Current transmission assembly for automatic transmission, a standard accessory in the modern vehicles, can provide normally 4 or 5 gear ratios between the prime mover and the driven wheels for building up the necessary torque while the vehicle moves from zero speed to the normal speed, and for over drive. The variable transmission systems currently in use, including the one patented by me in India, patent no: 198239, (published on Jul. 2, 2003) relay upon planetary gear, with flexible pulley, hydraulic motors, or electric generators for transmitting the power, which suffer from the limited capacity and the inability to efficiently and effectively transmit the power due to conversion of mechanical power into pressure energy, electrical energy etc. and back to mechanical energy. There are also known "torque transfer systems" (Phelan) which can be used only for forward movement, in one configuration, and not for reverse and overdrive, which needs different configurations of gear elements. These systems can be used only for differential drives and produce excessive heat during normal operation wherein one of the hydraulic pumps will discharge against the other hydraulic pump, keeping both the pumps in a locked position having no torque differentiation. Additionally, these transmission systems are expensive and suffer from operational inefficiency such as delay for automatically correcting the torque level for different driving conditions, resulting in excessive fuel consumption, poor acceleration, dirty emission and high rate of wear.

SUMMARY OF INVENTION

This invention discloses a transmission assembly which provides for any gear ratio right from zero to infinity, for forward and reverse movement as well, including the step up ratio for over drive, with an additional provision for higher ratio for building up higher torque for special circumstances, all in one configuration, resulting in better fuel efficiency, high pollution standard, less wear and better acceleration. This was made possible in this system by incorporating a differential gear unit, having its output shafts connected to sun gear and planet carrier respectively, and thus enabling the sun gear and the planet carrier to operate with large flexibility, anywhere from zero to twice the input speed. It was also made possible for the 2 hydraulic pumps connected to the sun gear and planet carrier respectively to operate in tandem during normal operation, eliminating all possibilities for generating excessive heat. Additional benefit of the present invention is that the transmission takes place only through gears maintaining high transmission efficiency. Another embodiment of the present invention includes a controller enabling the system to continuously check the torque level and to correct the gear ratio at any stage to the exact need, further improving the fuel efficiency, the emission standard, and the acceleration.

In view of the above, the present invention is directed to an infinitely variable gear transmission system including a differential gear unit for input, an epicyclic gear unit, two hydraulic pumps and a hydraulic circuit. In one embodiment the hydraulic circuit having direction control valves and orifices, intercouples the two hydraulic pumps, one of the hydraulic pumps rotating with the first output shaft of the differential gear unit and one of the three gear elements of the epicyclic gear unit, and the second hydraulic pump rotating with the second output shaft and the second gear element, and includes a control unit to selectively control the direction of fluid flow in the hydraulic circuit and control the resistance exerted by the fluid pressure determining the speed of the third gear element for output. In another embodiment the hydraulic circuit includes a flow control valve with variable orifice and a controller operable to control the opening of the variable orifice, and precisely control the resistance exerted by the fluid pressure.

Further scope of applicability of the present invention will become apparent from the following detailed description, claims, and drawings. However, it should be understood that the detailed description and specific examples, while indicating preferred embodiments of the invention, are given by way of illustration only, since various changes and modifications with in the spirit and scope of the invention will become apparent to those skilled in the art.

BRIEF DESCRIPTION OF DRAWINGS

The present invention will become more fully understood from the detailed description given here below, the appended claims, and the accompanying drawings in which:

FIG. 1 in sheet no. 1 is a sectional view of the differential gear unit with each of the hydraulic pumps attached to each of the output shafts on either side, and the pair of gears coupling the epicyclic gear unit on either side.

In sheet no: 2, FIG. 2 is the 3-Dimensional view of the differential gear unit.

In sheet no: 3, FIG. 3 is the sectional view of the epicyclic gear unit with each of the input gears on either side coupling the output shafts of the differential gear unit, and the output gear to be coupled to the drive shaft of the vehicle.

In sheet no: 4 FIG. 4 is the 3 dimensional view of the epicyclic gear unit.

In sheet no: 5, FIG. 5 is the schematic illustration of the hydraulic circuit, with the hydraulic pumps, direction control valves, orifices, flow control valve with variable orifice and it's actuating mechanism.

In sheet no: 6, FIG. 6 is a schematic illustration of the hydraulic circuit indicating the direction of fluid flow for the various modes of operations and the fluid reservoir.

In sheet no: 7, FIG. 7 shows the curve for the input speed into the system and the relative output speed in revolutions per minute.

In sheet no: 8, FIG. 8 represents the electrical control circuit to operate the solenoid valves in order to change the direction of the fluid flow in the hydraulic circuit depending on the mode of operations.

In sheet no. 9, FIG. 9 is the 3-dimensional view of the general assembly of the equipment in accordance with this invention.

DETAILED DESCRIPTION OF THE PREFERRED EMBODIMENT

The details of the differential gear unit, as shown in FIG. 1, includes the level gear 19 for the power input, the driven bevel gear 12 attached to the differential body 14 enclosing the pinions, one of the two revolving pinions 13, one of the two rotating pinions 18, the right side hydraulic pump 17 fixed on the right side output shaft of the differential unit, the left side hydraulic pump 20 fixed on the left side output shaft, the driving helical gear 16 fixed on the right side output shaft of the differential gear unit and meshing with the driven helical gear 15, and the driving helical gear 10 fixed on the left side output shaft of the differential gear unit meshing with the driven helical gear 11.

The details of the epicyclic gear unit, as shown in FIG. 3, includes the main shaft 36 of the unit, the bush 39 fixed on the main shaft and rotating with the planet carrier 33 carrying the planets 32 and 38 rotating with the planet carrier while rotating about their own axis, the sun gear 31 freely mounted on the main shaft meshing with the planet gears and rotating with the input gear 37 meshed with the right side driven gear 15 of the differential gear unit, the input gear 41 on right side, fixed on the main shaft and meshing with the left side driven gear 11 of the differential gear unit, the output gear 40 freely mounted on the main shaft with the bronze bush 35 and rotating with the ring gear 34 meshing with the planet gears.

The details of the hydraulic circuit, as shown in FIG. 5, includes the right side (RS) hydraulic pump 67 with orifice (T-1) 56 and solenoid valve (V4) 54 in its main delivery line 51, orifice (T-2) 57 and solenoid valve (V5) 53 in its alternate delivery line on the left side, and the solenoid valve (V8) 68 and flow control valve with variable orifice 69 in the alternate delivery line on the extreme left. The control cylinder 72 actuated by the microprocessor has its piston attached to a rack 70 meshing with the pinion 71 fixed on the valve spindle. The left side (LS) hydraulic pump 62 has the solenoid valve (V-2) 63 in its suction line, solenoid valve (V3) 55 in its main delivery line, and solenoid valve (V6) 52 and orifice (T-3) 60 in the alternate delivery line 61 on right side. The solenoid valve (V-7) 64 directs the displacement from the right side pump to the suction chamber of the left side pump through connecting line 65. The solenoid valve (V-1) 66 directs the displacement from right side pump to the common suction line 59 connected to the fluid reservoir 58.

The details of the input speed and the relative output speed, as shown in FIG. 7, includes the forward movement of the vehicle represented by the curve ABCD. The curve OA represents the idle portion; AB represents the low gear portion; BCE represents direct drive and CD represents over drive. The reverse is represented by the curve AR. The curve FC represents the forward movement in high gear.

The details of electrical circuit, as shown in FIG. 8, includes 5 modes of operation. P represents the parking position. F represents the forward movement. HF represents the high gear forward movement. R represents the reverse movement. CC represents the 5$^{th}$ mode where in the displacement from the right side pump will be directed through flow control valve 69 to be controlled by microprocessor. C1 is a microprocessor controlled two way switch to choose from gear drive, direct drive and over drive. S1, S2, S3, S4, S7 and S8 are change over switches activated by speed sensors at the rated speed and remains activated above the rated speed. V1 to V8 are solenoid valves which normally remain closed, and opened on energizing. M1 is a manually operated switch to maintain direct drive at slow speed. M2 is a manually operated switch to avoid over drive.

When the power from the prime mover (engine) is transmitted to the differential unit through the bevel gear pair, the output shafts of the unit start rotating. The rotation of the output shafts follows the formula $2N=N1+N2$ - - - Formula (1) where as N is the engine speed in rpm (hereafter referred to as speed). N1 is the right side output shaft speed and N2 is the left side output shaft speed.

While the vehicle control lever is in the park position the valves V1, V2 and V3 are open as shown in FIG. 8 and therefore the hydraulic pump on right side sucks the fluid and pumps the fluid back into suction line; The left side pump sucks the fluid and deliver back into the reservoir, as shown in FIG. 5. Therefore the output shafts are free to rotate at any speed.

In the case of epicyclic gear if X1 is the speed of the sun gear, X2 is the speed of planet carrier and X is the speed of ring gear (annulus) $X1=4.5X2-3.5X$ - - - Formula (2). (The annulus is connected to the vehicle through the output gear) whereas $(Z1+Z2)/Z1=4.5$ and $Z2/Z1=3.5$; $Z1$=No. of teeth on sun gear=24 and $Z2$=No. of teeth on annulus=84.

If the engine speed is 1500 rpm, on applying formula (1) N1 will be equal to 2455 and N2 will be equal to 545. Similarly if the engine speed is 2000 rpm, N1 will be equal to 3273 and N2 will be equal to 727. If the engine speed is 3000 rpm, N1 will be 4909 and N2 will be 1091. In all these cases applying the value of X1 and X2 in formula (2), the output speed of epicyclic gear unit, i.e. the value of X will be zero; (N1=X1 and N2=X2); and therefore the vehicle will be at stand still when the control lever is in 'P' position.

When the vehicle control lever is in F (forward position), till the engine speed is raised to 1500 rpm the same situation will continue. At 1500 rpm the engine speed sensor will activate S1 switch to operate valves V4, V2 and V3 of the hydraulic circuit. Since V2 and V3 are open the left side gear pump is freely running; but the right side gear pump is pumping through the valve V4 and the orifice T1 (56 in FIG. 5) which restricts the speed of the RS pump to 2454 RPM. This results in a reduction of the vehicle speed. It can be noted from formula (2) that the tendency of the right side pump will be to run faster and the left side pump to run slower, during the forward movement of the vehicle. Since 2N=N1+N2 the right side pump will continue to run at 2454 rpm irrespective of engine speed, while the left side pump speed will go on increasing depending on engine speed.

The output speed of the epicyclic gear unit, corresponding to 1500 to 2454 rpm (engine speed) has been given below in Table I.

Example: When engine speed is 2000 rpm, the R.S. output shaft speed is 2454 rpm.

Applying $$2N=N1+N2 \qquad \text{formula (1)}$$

$$2\times2000=2454+N2$$

Therefore N2=1546

Applying $$X1=4.5X2-3.5X \qquad \text{formula (2)}$$

X1=N1 & X2=N2

Therefore $2454=4.5\times1546-3.5X$ and X=1286

TABLE I

| | (rpm) | | |
|---|---|---|---|
| Engine Speed N | R.S. output shaft speed N1 | L.S. output Shaft speed N2 | Epicyclic gear output speed X |
| 1500 | 2454 | 546 | 0 |
| 1525 | 2454 | 596 | 65 |
| 1600 | 2454 | 746 | 258 |

TABLE I-continued

| | (rpm) | | |
|---|---|---|---|
| Engine Speed N | R.S. output shaft speed N1 | L.S. output Shaft speed N2 | Epicyclic gear output speed X |
| 1700 | 2454 | 946 | 515 |
| 1800 | 2454 | 1146 | 772 |
| 1900 | 2454 | 1346 | 1029 |
| 2000 | 2454 | 1546 | 1286 |
| 2454 | 2454 | 2454 | 2454 |

The output speed is ranging from 0 to 2454, to provide enough starting torque for the vehicle during the gear drive.

At 2454 rpm the speed sensor will activate S2 switch to operate the valves V3 and V7 of the hydraulic circuit. In this condition the displacement of the right side pump is directed to the suction chamber of the left side pump. Since right side (hereafter referred to as R.S.) pump is always trying to run faster and the left side (hereafter referred to as L.S.) pump is always trying to run slower, the result will be both the pumps will be running at the same speed. This means both LS and RS output shaft and the engine will run at the same speed; the output of the epicyclic gear will also be the same as shown below. $X1=4.5X2-3.5X$. Since $X1=N1=N2=X2$, $X1=4.5X1-3.5X$, Therefore $X=X1$; At the speed of 5250, L.S. and R.S. output shafts, and also the epicyclic gear output will be 5250. In this condition the vehicle is in direct drive.

At 5250 rpm (engine speed) the speed sensor will activate S3 switch to operate the valves V2, V3 and V5. Since V2 and V3 are opened the L.S. pump will operate freely; but the R.S. pump will deliver through the alternate delivery line through the valve V5 and orifice T2 (57 in FIG. 5) which restricts the speed of the RS pump to 5250. The speed of LS and RS output shafts and epicyclic gear output at various engine speed have been given below. (Table II)

TABLE II

| | (rpm) | | |
|---|---|---|---|
| Engine speed N | R.S. output shaft speed N1 | L.S. output shaft speed N2 | Epicyclic gear output speed X |
| 5250 | 5250 | 5250 | 5250 |
| 5400 | 5250 | 5550 | 5635 |
| 5500 | 5250 | 5750 | 5892 |
| 5750 | 5250 | 6250 | 6536 |
| 5900 | 5250 | 6550 | 6921 |
| 6000 | 5250 | 6750 | 7178 |

Ex: At 6000 engine speed.

$$2N=N1+N2 \qquad (1)$$

$$2\times 6000=5250+N2$$

Therefore N2=6750

$N1=X1 \ \& \ N2=X2$ $$X1=4.5X2-3.5X \qquad (2)$$

$$5250=4.5\times 6750-3.5X$$

Therefore X=7178. In this condition the vehicle is in over drive.

There is an option here to avoid over drive in which case switch M2 has to be manually actuated.

On return the vehicle speed will follow the same path till 5250 engine speed. Below 5250 engine speed, S3 will be deactivated and the vehicle will switch over to "direct drive" with the valves V3 and V7 opened. Below 2454 S2 will be deactivated; S1 will take over to open V4, V2 & V3; and the vehicle will follow the speed as already given in Table I. There is an option here to avoid gear drive between 1500 and 2454 in which case M1 has to be manually actuated. The vehicle will now continue in direct drive till the control lever is shifted to park position.

For the reverse drive the control lever has to be shifted to 'R' position. At 1500 speed the speed sensor will activate S7 and valves V2, V6 and V1 will open. Since V1 is open R.S. pump will be operating freely; but L.S. pump will suck the fluid through valve V2 and discharge through orifice T3 (60 in FIG. 5) and the speed of L.S. pump will be limited to 546. The vehicle will now move in reverse as given below. (Table III). It may be noted from the formula that during reverse, the L.S. pump will always try to run at higher speed and the R.S. pump will try to run at slower speed.

TABLE III

| | (rpm) | | |
|---|---|---|---|
| Engine speed N | R.S. output shaft speed N1 | L.S. output shaft speed N2 | Epicyclic gear output speed X |
| 1500 | 2454 | 546 | −0 |
| 1600 | 2654 | 546 | −56 |
| 1700 | 2854 | 546 | −113 |
| 1800 | 3054 | 546 | −170 |
| 900 | 3254 | 546 | −227 |
| 2000 | 3454 | 546 | −285 |
| 2250 | 3954 | 546 | −427 |
| 2500 | 4454 | 546 | −570 |
| 2750 | 4954 | 546 | −713 |
| 3000 | 5454 | 546 | −856 |

Example: At 2000 engine speed $X1=4.5X2-3.5X$ $$3454=4.5\times 546-3.5X$$

Therefore X=−285.

There is an option for high torque forward drive. In this case the control lever has to be brought to HF position, where in at engine speed 3208, the sensor will activate S4 to operate V2, V3 & V5. Since V2 & V3 are open the L.S. pump will operate freely. The R.S. pump will operate through the alternate delivery line and the speed will be limited to 5250. The vehicle speed will be as shown in Table IV. Below 3208, S4 will be deactivated and the vehicle will move to neutral. In this position the vehicle will have higher torque. This drive is basically meant for high ranges.

Example: At 4000 engine speed, R.S. output shaft speed is 5250.

Applying $$2N=N1+N2 \qquad \text{formula (1)}$$

Therefore $2\times 4000=5250+N2$

Therefore N2=2750

Applying $$X1=4.5X2-3.5X \qquad \text{formula (2)}$$

$N1=X1 \ \& \ N2=X2$

Therefore $5250=4.5\times 2750-3.5X$

Therefore X=2035

TABLE IV

| | (rpm) | | |
|---|---|---|---|
| Engine speed N | R.S. output shaft speed N1 | L.S. output shaft speed N2 | Epicyclic gear output speed X |
| 3208 | 5250 | 1166 | 0 |
| 3250 | 5250 | 1250 | 107 |
| 3500 | 5250 | 1750 | 750 |
| 4000 | 5250 | 2750 | 2035 |
| 4500 | 5250 | 3750 | 3321 |
| 5000 | 5250 | 4750 | 4607 |
| 5250 | 5250 | 5250 | 5250 |

In another embodiment, the system is provided with a flow control valve with variable orifice 69, the orifice of which will be adjusted by the microprocessor to control the resistance exerted by the fluid pressure and to provide the required torque at the exact time. (Please see item 5 in FIG. 8). For this facility of "drive by wire", the vehicle control lever has to be brought to position CC. Please also see the control cylinder 72 with the rack 70 and pinion 71 in FIG. 5. In position CC, valves V1, V2 and V3 will be opened and the vehicle will be in neutral. The microprocessor will now come into action, set the flow control valve so as to limit the right side output shaft speed to 300 rpm. When the engine speed is increased to 1833 rpm, S8 will be activated to open valves V2, V3 and V8 so that the flow will be diverted through the alternate route on the extreme left (Please see FIG. 5). The vehicle will now start moving as given below.

TABLE V

| | (rpm) | | |
|---|---|---|---|
| Engine speed N | R.S. output shaft speed N1 | L.S. output shaft speed N2 | Epicyclic Gear output speed X |
| 1833 | 3000 | 666 | 0 |
| 1900 | 3000 | 800 | 171 |
| 2000 | 3000 | 1000 | 428 |
| 2100 | 3000 | 1200 | 685 |
| 2300 | 3000 | 1600 | 1200 |
| 2500 | 3000 | 2000 | 1714 |
| 2700 | 3000 | 2400 | 2229 |
| 2900 | 3000 | 2800 | 2743 |
| 3000 | 3000 | 3000 | 3000 |

During the speed range from 1833 to 3000 rpm the microprocessor will continuously receive the data on the throttle position, the suction pressure of the engine, the engine temperature, the RS output shaft speed and the engine speed through sensors. If the engine speed and the suction pressure matches with the throttle position, and the temperature is steady, the indication is that the engine produces enough torque required for the traction. At the moment there is an adverse change in any of the conditions, the microprocessor will immediately adjust the flow control valve to open more reducing the fluid pressure and increasing the speed limit for the R.S. output shaft. This will reduce the output speed and increase the torque level. At 3000 speed, if sufficient torque is available and the conditions remain steady the microprocessor unit gives a signal to C1 to open V3 and V7. The vehicle will now move in "direct drive". At 5250 engine speed, the micro processor will give another signal to C1 to open V2, V3 and V8, and set the flow control valve restricting the speed of R.S. shaft at 5250. The vehicle will now run in "over drive", under the same conditions, as given in table II above. On return, at 5250 engine speed the microprocessor will give another signal to C1 to open V3 and V7 to change over to direct drive. Throughout the forward drive the microprocessor will continuously check the torque level and if found necessary will immediately adjust the orifice of the flow control valve and correct the torque level.

The idle speed range and the speed limit settings of the differential gear output shafts can be selected depending on the type of vehicle and the users preference. The electrical circuit can be replaced by electronics, in which case the control lever also can be replaced by 6 interlocked keys. Instead of orifice T3, (60 in FIG. 5) the system can be provided with another flow control valve with variable orifice which can be also controlled by microprocessor, in order to have the accurate speed setting for the left side shaft, and the exact output speed as well, during reverse drive. The entire drive transmission can be controlled by a 32 bit 40 MHz microprocessor.

The foregoing discussion discloses and describes the exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

I claim:

1. An infinitely variable gear transmission system comprising: a differential gear unit coupled to a power input from a prime mover of a vehicle; two hydraulic pumps; a single stage epicyclic gear unit drivably intercoupling a sun gear with a first output shaft of said differential gear unit, and a planet carrier with a second output shaft, said epicyclic gear unit including the sun gear, a ring gear, the planet carrier, and at least one planet gear mounted on said planet carrier to rotate with and relative to said planet carrier and meshed with the sun gear and ring gear; wherein, a hydraulic circuit having direction control valves and orifices, hydraulically intercoupling one of the hydraulic pumps coupled to the first output shaft of said differential gear unit, and the second hydraulic pump coupled to the second output shaft, and a control unit selectively controlling the direction of a fluid flow and a resistance exerted by the fluid pressure on the sun gear and the planet carrier to control the speed of the ring gear of said epicyclic gear unit coupled to a drive shaft of the vehicle, in both clockwise and anticlockwise direction, to provide the desired speed, during forward, reverse and over drive.

2. The infinitely variable gear transmission system of claim 1 wherein said hydraulic circuit includes a flow control valve with variable orifice, and a controller communicating with said control valve to control the opening of the variable orifice and the resistance exerted by the fluid pressure, based on continuous input from sensors, and correct the speed of ring gear to provide an exact output speed.

* * * * *